United States Patent [19]
Schein et al.

[11] Patent Number: 5,959,688
[45] Date of Patent: Sep. 28, 1999

[54] TELEVISION SCHEDULE SYSTEM AND METHOD OF OPERATION FOR MULTIPLE PROGRAM OCCURENCES

[75] Inventors: Steven M. Schein, Menlo Park; David P. Warden, Belmont; Molly K. King; Theresa A. Alba, both of Fremont; Robert E. Russman, Pleasanton, all of Calif.

[73] Assignee: StarSight Telecast, Inc., Fremont, Calif.

[21] Appl. No.: 09/120,704

[22] Filed: Jul. 22, 1998

Related U.S. Application Data

[63] Continuation of application No. 08/665,216, Jun. 14, 1996, Pat. No. 5,801,787.

[51] Int. Cl.$^6$ .................................................... H04N 5/50
[52] U.S. Cl. ........................... 348/569; 348/906; 348/589
[58] Field of Search .................................. 348/563, 564, 348/569, 600, 906, 589; H04N 5/50, 5/445

[56] References Cited

U.S. PATENT DOCUMENTS

| | | | |
|---|---|---|---|
| 4,488,179 | 12/1984 | Kruger et al. | 358/181 |
| 4,706,121 | 11/1987 | Young | 358/142 |
| 4,751,578 | 6/1988 | Reiter et al. | 358/183 |
| 4,908,713 | 3/1990 | Levine | 358/335 |
| 5,335,277 | 8/1994 | Harvey et al. | 380/20 |
| 5,353,121 | 10/1994 | Young et al. | 348/563 |
| 5,523,796 | 6/1996 | Marshall | 348/589 |
| 5,596,373 | 1/1997 | White | 348/569 |
| 5,684,525 | 11/1997 | Klosterman | 348/906 |
| B1 4,706,121 | 12/1993 | Young | 358/142 |

OTHER PUBLICATIONS

Goldberg, "A 35–inch Zenith TV premieres StarSight's onscreen guide," *Video* (Apr. 1995) p. 41.

StarSight User's Manual.

*Primary Examiner*—Sherrie Hsia
*Attorney, Agent, or Firm*—Christie, Parker & Hale, LLP

[57] ABSTRACT

An improved television guide system. According to one embodiment of the invention, television guide information is provided that includes multiple occurrences of a single show. The guide system of the present invention allows the user to identify a show and, thereafter, identify when the identified show will be played again. Accordingly, the user may more easily select shows for viewing or recordation.

15 Claims, 4 Drawing Sheets

GONE WITH THE WIND

| SOURCE | DAY | TIME |
|--------|-----|------|
| HBO1 | TODAY | 11:00 AM |
| HBO1 | TODAY | 11:00 PM |
| HBO2 | TODAY | 11:30 PM |
| DSS 1 | WED, 5/8 | 4:00 AM |
| NBC | TH, 5/9 | 5:00 PM |
| INTERNET | | |
| BLOCKBUSTER | | |

*FIG. 3.*

TELEVISION SCHEDULE SYSTEM AND METHOD OF OPERATION FOR MULTIPLE PROGRAM OCCURENCES

CROSS-REFERENCE TO RELATED APPLICATIONS

This application is a continuation of application Ser. No. 08/665,216, filed on Jun. 14, 1996, allowed for issuance on Feb. 26, 1998, U.S. Pat. No. 5,801,787.

BACKGROUND OF THE INVENTION

The present invention relates to the field of television schedule guides and their method of operation. More specifically, in one embodiment the invention provides a method and apparatus for identifying when a particular show is being broadcast in a television guide system.

As video entertainment becomes increasingly sophisticated, consumers are provided with wider options in video entertainment. In addition to conventional broadcast television programs, a television viewer may now have access to, for example, cable television programming, digital satellite service programming, cable stereo broadcast, and conventional satellite programming. Moreover, within each of the various transmission media available to the consumer, the number and variety of programs is increasing dramatically.

While benefitting consumers through greater selection, the array of programming available to consumers also presented a certain dilemma. Specifically, as the number of programs available to the consumer became large, the process of selecting which program to view became increasingly onerous. For example, a consumer may have access to well over 100 cable television channels. If a particular consumer has access to not only cable programming, but also other programming (such as digital satellite service) the process of choosing a program would have been daunting.

Accordingly, new and improved methods of providing program guide information have been developed for display on the television screen of the consumer's television. Of particular note, the StarSight™ onscreen guide system has proven to be pioneering in the field of onscreen guide systems. The StarSight system provides not only television listings, but also capabilities such as theme searching, VCR programming, detailed program information, and other functionality.

Recently, additional functionality is suggested in such systems. See U.S. application Ser. No. 08/665,216, U.S. Pat. No. 5,801,787, incorporated herein by reference for all purposes. In one such system, guide information from, for example, disparate sources such as satellite sources and cable sources is combined to form a unified guide.

A system according to this invention may, for example, eliminate redundant information from such sources and provide other functionality.

Significant strides have been made via the StarSight guide system, and in fact such guide systems are achieving widespread acceptance in the television industry. As the complexity of such systems increases, however, still further functionality is desired.

SUMMARY OF THE INVENTION

An improved television guide system is provided by virtue of the present invention. According to one embodiment of the invention, multiple occurrences of a single show may be identified for a user. For example, in many digital satellite systems today, a particular movie will be played on multiple channels with offset start times. The guide system of the present invention allows the user to identify a particular show and, thereafter, identify when the identified particular show will be played again. The user may therefore more easily select shows for viewing or recordation.

Accordingly, in one embodiment the invention provides a method of generating television guide information for a viewer comprising the steps of inputting schedule guide information into a guide system; receiving user input to identify a particular show in the schedule guide information; and identifying for the user other times when the particular show will be shown.

A further understanding of the nature and advantages of the inventions herein may be realized by reference to the remaining portions of the specification and the attached drawings.

BRIEF DESCRIPTION OF THE DRAWINGS

FIG. 3 is a display provided to the user when the "when-else" feature is utilized.

DESCRIPTION OF THE PREFERRED EMBODIMENTS

Figure 1:
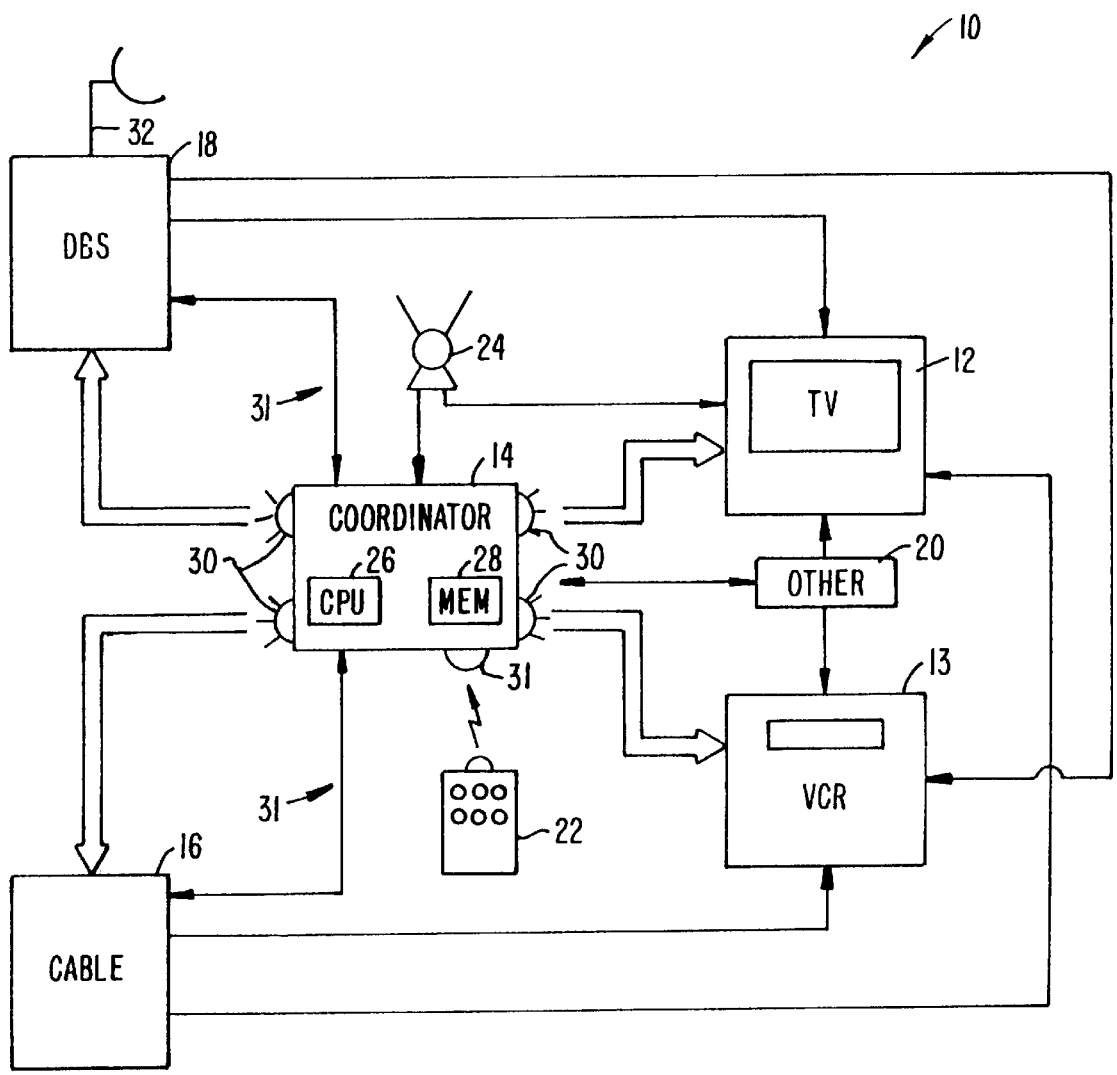
FIG. 1 is an overall diagram illustrating a television system in accordance with one embodiment of the invention.

The present invention utilizes television schedule guide information which may be obtained from one or several sources. These sources may include an incoming cable line (e.g., on a coax cable), satellite broadcasts, a dedicated telephone line (e.g., a twisted pair), and any other medium capable of transmitting a signal, such as a computer or modem line. Although the invention will find wide use in systems with only a single source of television signals, such as a satellite system, the invention will be illustrated herein primarily in relation to a system where broadcasts are received from at least two separate sources such as (1) cable and a satellite dish, or (2) two different satellites, or (3) local cable and digital broadcast sources (DBSs), or (4) a conventional antenna . . . and a satellite dish such as a DBS source, or (5) one of the above sources and an internet or other computer source. The multisource schedule information is sorted and displayed to the user in an organized fashion as described in greater detail in U.S. application Ser. No. 08/423,410, incorporated herein by reference.

When a user selects a show within a displayed guide, the system reads a source identifier associated with that show or channel. In the preferred embodiment, the system then carries out an automatic switching/tuning process that switches the input to the television (either RF or video) to a source device. Exemplary source devices include a DBS, a cable box, a television tuner, an internet access, etc. The system then tunes to the required channel for the desired show. Additionally, the source identifier can be utilized to switch between various devices automatically when unattended VCR programming is desired. Furthermore, when program information is received from multiple satellite sources and a desired channel is selected, the present invention can, in one embodiment, automatically move the customer's satellite dish such that the customer receives the desired program from the associated source. The present invention then tunes to the correct channel.

In creating a merged television guide, a channel map is created which identifies the channels available on the multiple sources, and identifies their source. For example, in the case of DBS/local channel implementations, a channel map is created with both local cable and DBS channels merged. The local channels and the DBS channels are tagged with a source identifier. This merged guide information is used by the system to identify when a particular show is to be played, even when it is not from the same source as another instance of the same show.

When the user/consumer selects a non-DBS channel from the guide, the integrated receiver decoder unit (IRD box) for the satellite switches the IRD to couple the local cable, for example, to the receiver. The system then tunes the television tuner or other tuning device to the required channel. If a DBS channel is later selected, the system switches the IRD to couple the satellite receiver/decoder to the receiver. The system then tunes the DBS tuner to the selected DBS channel. In the case of, for example, cable and antenna inputs, the system switches to the correct video input and then tunes the television tuner to the required channel for receiving the selected source. Thus, automatic access to multi-source television schedule guide information is provided.

While the present invention is illustrated herein primarily in relation to a system in which the merged guide is formed at the user's location, it will be understood that this is only for the purposes of illustration, and the merged guide may be formed at a remote location such as a cable head-end.

FIG. 1 illustrates in simplified form an example of a multi-source television schedule guide system 10 with multiple sources connected directly or indirectly to a television 12 and/or VCR 13. In the embodiment in FIG. 1, multi-source television program and television schedule guide system 10 operates under the control of coordinator 14. Television 12 and VCR 13 are provided with inputs from cable box 16 and DBS source 18 either directly as illustrated in FIG. 1, or via coordinator 14. Other inputs 20 may also be supplied to the television and/or VCR directly or via the coordinator 14. A remote control 22 is used by a viewer to tune the television and conduct other operations. In alternative embodiments, a keyboard, such as a computer keyboard, is used for input. The keyboard may be hard-wire connected or wireless.

In this embodiment, cable is provided via cable box 16, and DBS is provided via IRD box 18. Antenna 24 may be used as additional sources of television broadcasts along with cable box 16, IRD box 18, and other inputs 20. In one typical embodiment, antenna 24 and cable box 16 would be considered "local" sources meaning that they likely contain local television broadcasts such as local news broadcasts. By contrast, DBS sources would not be considered local because they would likely not contain such local content.

Other inputs 20 can include multiple satellite sources. When multiple satellite sources are present, coordinator 14 switches between the available satellite sources by automatically moving the user's satellite dish or switching between satellite dishes. In order to automatically move the satellite dish, a memory within IRD box 18 (or elsewhere) tracks the position of the DBS satellite dish in relation to satellite sources which are available via the DBS satellite dish. The IRD box 18 then automatically positions the DBS satellite dish such that the desired satellite source is received by the IRD box 18.

Coordinator 14 includes processor (CPU) 26 and memory (typically RAM) 28 that serve as the primary devices for operating the system. In the case where the various television signal sources are provided to the coordinator, the coordinator may also contain elements such as an internal tuner, a switching device for switching between sources, and other components. In the embodiment shown in FIG. 1, the coordinator is connected to and controls infrared (IR) emitter(s) 30. IR receiver 31 is connected to coordinator 14 and receives input from the remote or keyboard 22 to provide the necessary user input to the system. IR emitter(s) 30 can be replaced by, for example, a hard wired interface, a bus interface, or an RF transmitter. The IR emitter(s) 30 and/or direct connections (e.g., 31) control one or more of IRD box 18, . . . television 12, VCR 13, cable box 16, and other inputs 20. IR emitter(s) 30 acts as a remote control device by emulating remote control signals of television 12, VCR 13, cable box 16, and/or other devices. Coordinator 14 can, in some embodiments, be placed in, for example, the cable box 16, VCR 13, television 12, a satellite receiver or even the keyboard/computer.

Remote control 22 is a hand-held remote controller for controlling coordinator 14. In the preferred embodiment, remote control 22 is provided with an IR transmitter which controls the coordinator via IR receiver 31. Other remote controls, not shown in FIG. 1, can be used for manually controlling television 12, VCR 13, cable box 16, IRD box 18, and other inputs 20 although, in a preferred embodiment, coordinator 14 performs all the necessary control functions of the system. For example, as the user adjusts the volume control on remote 22, coordinator 14 emits signals through IR emitter 30 to adjust the volume in television 12.

IRD box 18 receives television programs along with other information via, in one embodiment, satellite dish 32. IRD box 18 and the other sources of television signals each provide program schedule information to the system. This program schedule information (or guide) may also include a channel map that contains the channel information indicating which channels are available on that source. Information associated with the DBS guide and others is saved in the IRD box receiver's RAM or downloaded to the coordinator 14. Similarly, program guide information can be received through cable box 16, other inputs 20, antenna 24, and/or through any other transmission medium (e.g., dedicated twisted pair telephone line). Each of these sources may also be provided with television schedule data within the signal transmitted by the service provider.

Coordinator 14 finds and sorts the program guide information available in system 10. Various formats can be used for the television schedule information. For example, data packets comprising a simple header section and an information section can be received and sorted with other, more complex data packet formats, or a header with source information can be added. In the preferred embodiment, coordinator 14 takes the television schedule information from the available source(s) or a data input line and sorts/mixes it. For example, coordinator 14 may receive program schedule information via the vertical blanking interval in a television channel or via a transponder for the DBS, or the internet, and then arrange the information in an organized fashion, or perform other operations. For example, the system may eliminate duplicate channels.

In an alternative arrangement, the sorting/mixing of program schedule information is done in a separate location and then provided to system 10, for example, on a simple satellite channel. Thus, program schedule information, which has already been mixed, sorted, organized, etc., is received in a format which is ready for display. This ready-for-immediate-display format can also be provided in a separate data stream via a different medium or on a television channel.

Figure 2:
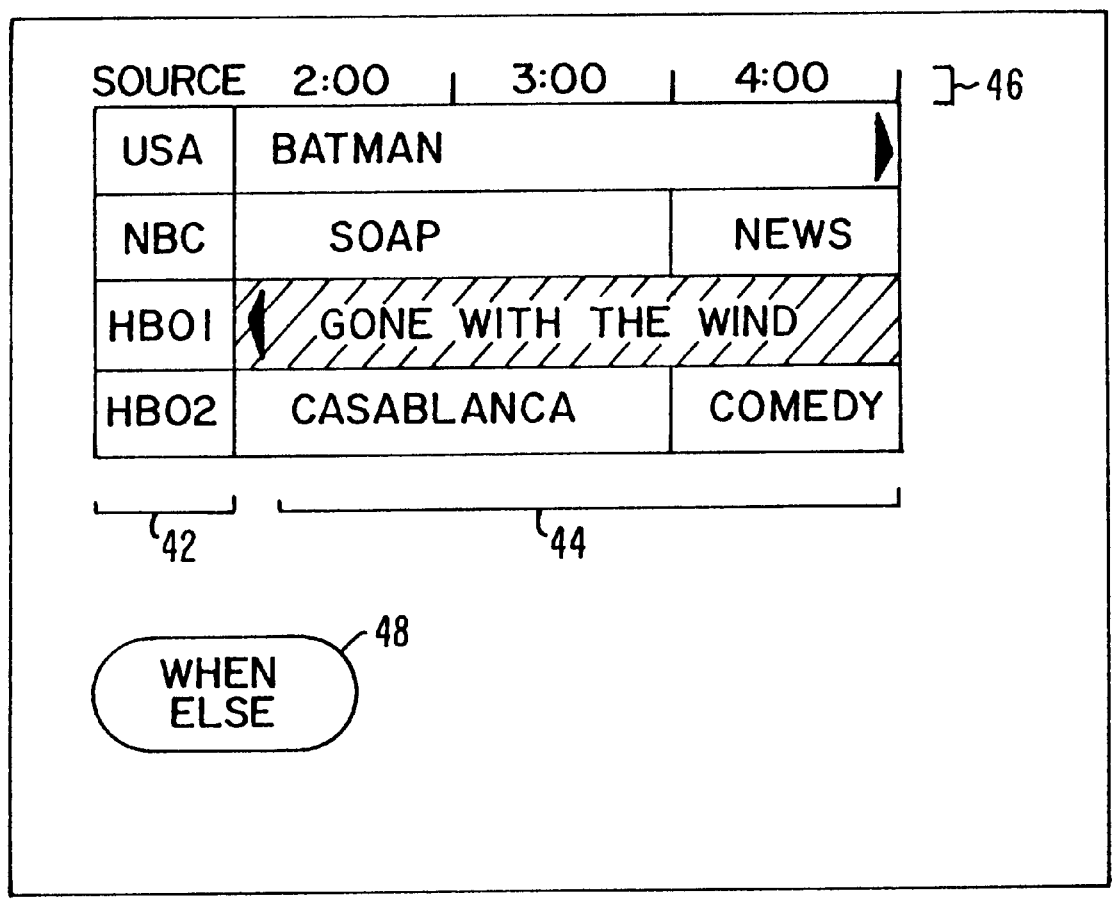
FIG. 2 is a typical grid guide used according to one embodiment of the invention.

FIG. 2 is a simplified example of an on-screen display of a schedule grid guide that has been assembled from the television guide information. This display may be presented on a television screen, a personal computer that conducts the overall process, or a television sensor display generated by a personal computer. In the preferred embodiment, after coordinator 14 has collected and sorted all the available program guide information, coordinator 14 generates the grid guide set forth in FIG. 2 for display on television 12 via, for example, a direct connection (not shown) to TV 12 or via an overlay on one of the sources such as cable source 16. In the preferred embodiment, the user displays grid guide 40 by pressing a guide button on remote control 22. Coordinator 14 responds to the initial pressing of the guide button by automatically tuning to the channel or device which carries grid guide 40, or overlaying a grid guide in a current broadcast. When the user is done with grid guide 40, the user presses the guide button again (or an exit button) and coordinator 14 (1) automatically returns to the channel or source last viewed by the user or (2) removes the overlay.

The grid guide, designated generally with the reference numeral 40, provides a line up of all channels or a selection of channels 42 along with a description of the shows 44 available on those channels at certain times 46. For example, the USA network is showing BATMAN beginning at 2:00 p.m. A SOAP is shown on NBC from 2:00 p.m. to 4:00 p.m., followed by NEWS. The information may be sorted and/or filtered by, for example, theme(s) according to Young et al., U.S. Pat. No. 4,706,121, incorporated herein by reference for all purposes.

When multiple sources are used for receiving television channels, an overlap of channels sometimes occurs. For example, both cable and DBS may carry the network NBC, but cable may have NBC on channel 6 and DBS may have NBC on channel 7. By having the ability to delete and activate the channels displayed in grid guide 40, the user can determine whether to display one of the NBC channels, both of the NBC channels, or neither of the NBC channels. In an alternative embodiment, coordinator 14 may automatically note duplicate network names and delete one of the duplicates.

The user may utilize the remote control device to move a cursor or other indicator from position to position in the grid guide. The cursor ma-y be indicated by, for example, coloring the display of the indicated show differently from the rest of the shows. In the embodiment shown in FIG. 2, the cursor is directed to GONE WITH THE WIND and is indicated by cross hatching. In this particular instance the double marks to the left of the display indicate that GONE WITH THE WIND has been playing for some period of time already. Accordingly, the user may wish to find out if the movie GONE WITH THE WIND is showing at other times such that the user may either automatically record the future presentation of GONE WITH THE WIND, automatically tune to the future presentation of GONE WITH THE WIND, or simply be aware that GONE WITH THE WIND will be showing at a future time.

Accordingly, the user provides input to the system to indicate that the user would like to know "when-else" the show will be presented. This input may be, for example, provided by pressing a dedicated button on the remote control, or by marking a show, toggling the cursor to a "when-else" screen display button 48, and striking an "enter" button on the remote control. Of course a full keyboard will allow more versatile operation.

In either event the controller 14 searches the stored schedule information for other occurrences of that particular show. As used herein, the term "particular show" refers to a specific movie or other unique show. In the case of a series of shows (e.g., the COSBY SHOW) the term "particular show" will refer to a specific segment or episode of that show. In the example in FIG. 2 the system searches for other occurrences of GONE WITH THE WIND and indicates to the user if, when, and where GONE WITH THE WIND will be played again. The particular show may or may not be shown again on the same source of video. Of course, a "show" may also refer to, for example, an FM radio broadcast as well as a television show.

FIG. 3 illustrates one possible outcome after entering the "when-else" button. As shown, the movie GONE WITH THE WIND is being played at multiple times in the future. Specifically, it is currently being shown on HBO1 as the user is probably already aware if the screen has been entered from a grid guide generated for the current time. In addition, the same channel is showing this movie at 11:00 p.m. on the same day. A different channel, HBO2, is showing this movie at 11:30 p.m. on the same day. In this particular illustration, HBO1 and HBO2 are provided to the user over the same source of television signals (in this case a cable service provider). Accordingly, it is seen that the invention is useful even when only a single source of service is utilized. The usefulness of the invention is further expanded when multiple sources of television signals are provided. In this example, GONE WITH THE WIND is also being shown on the next Wednesday at 4:00 p.m. on a DSS channel, as well as on the next Thursday on a conventional antenna network signal, NBC. Accordingly, when a particular show is played at different times the user may make use of this information, even when the show is broadcast over different sources of television signals.

Still other sources of the particular show (or information about the show) may be indicated. For example, in FIG. 4, the guide indicates an "Internet" source. Toggling to this source may provide the user with a direct internet connection that will, for example, provide information about the show or download the full show itself. Alternatively, advertising about the availability of the show at a video store (Blockbuster) may be provided.

After identifying when a show is to be played the user may conduct any one of several operations. In a common case the user will toggle the cursor down to a particular instance of the show, and strike a "record" button on the remote control. The system will then tune the VCR to the proper program at the designated time and record the show. In other embodiments, the user will mark the show to be placed in a reminder list. When the time for the show in the reminder list arises the system will either tune automatically to that show, or prompt the user to determine if the user wishes to have the television tuned to that particular channel. In other cases, the user may use the information for the purpose of recalling that he/she wishes to return to the television at that particular time.

Figure 4:
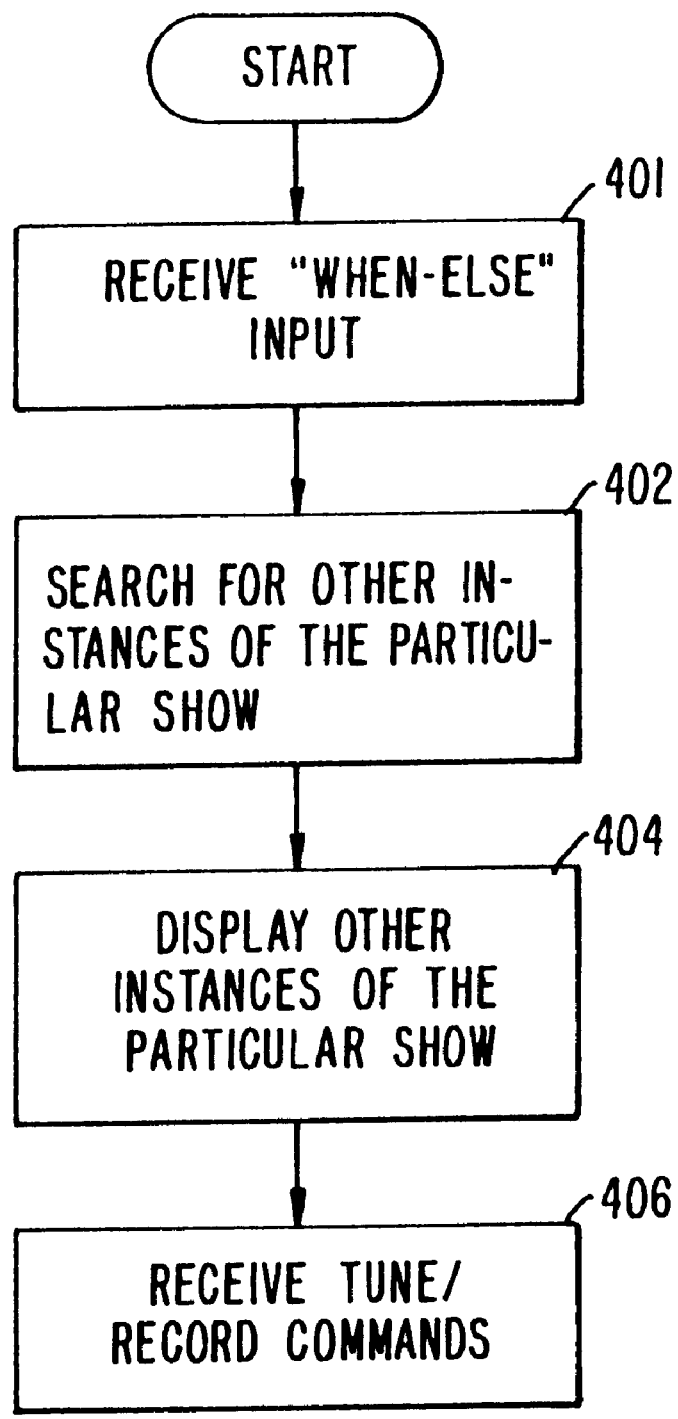
FIG. 4 is an overall flowchart illustrating operation of the invention.

FIG. 4 is an overall flowchart illustrating operation of the invention according to one particular embodiment. In most cases the operation shown in FIG. 4 will be performed under the direction of software stored on a RAM, ROM, or other computer-readable memory such as memory 28. The data may be stored locally, in an external database, or in a combination of both. In step 401 the system receives input indicating that the user wishes to identify other instances of a particular show. At step 402 the system searches for other instances of the particular show beginning at the present time. It should be recognized that the user may or may not be in a current time display in a guide when such input is provided. For example, the user may be scanning a listing of action movies that have been generated based on a theme search, and have the cursor on an instance of a particular movie one week in the future. When the user activates the "when-else" function the system will, in most embodiments, search for all instances of that particular show beginning at the actual present time, not the time one week in the future. In this manner the user may, for example, identify when a particular movie is showing in the next few hours, even though the user may have his/her interest peaked in a particular show based on a listing at a distant date.

In some embodiments, sources are searched in the stored guide information to identify other instances of a particular show. The search may be performed locally or externally, and may be based on show identity fields, or on term-based searching, or a combination of the two. After the other instances of that particular show have been identified, a display is generated at step 404 that includes a listing of the other instances of the particular show. If none are identified, the display can either contain no such listings, or indicate specifically to the user that no such listings have been identified.

Thereafter, at step 406 the user may perform any one of a wide variety of functions. Commonly the user may toggle down to an instance of the show, and strike a record button, or otherwise select the show for recordation. In other cases the user may simply return to the previous guide listing. In still other cases the user may toggle down to an instance of the show, and mark it for a future reminder to be generated for the user when that instance of the show arises. In still further embodiments, the system may store the request and, even if no other instances of the particular show are presently in the guide, provide alerts to the user when instances of the show are added to the guide.

The above description is illustrative and not restrictive. Many variations of the invention will become apparent to those of skill in the art upon review of this disclosure. Merely by way of example the invention has been illustrated primarily with regard to multiple source guide systems, but the invention is not so limited. The scope of the invention should, therefore, be determined not with reference to the above description, but instead should be determined with reference to the appended claims along with their full scope of equivalents.

We claim:

1. A method of generating a television guide information for a viewer for use in a television guide system having a television and at least one television signal source, the method comprising the steps of:
    (A) receiving schedule guide information from the television signal source for input into a television guide;
    (B) receiving viewer selection of a particular show from the television guide;
    (C) identifying for the viewer other times when the particular show will be shown and other sources of the particular show; and
    (D) displaying to the viewer the other times and the other sources of the particular show.

2. A method of generating a television guide information for a viewer for use in a television guide system having a television and at least one television signal source, the method comprising the steps of:
    (A) receiving . schedule guide information from the television signal source for input into a television guide;
    (B) receiving viewer selection of a particular show from the television guide;
    (C) searching the schedule guide information for all instances of the particular show starting from a present time;
    (D) storing the viewer selection of the particular show if no instances of the particular show are found;
    (E) alerting the viewer when other instances of the particular show are added to the schedule guide information; and
    (F) displaying to the viewer the other instances of the particular show.

3. A method of generating a television guide information for a viewer for use in a television guide system having a television and at lea-st one television signal source, the method comprising the steps of:
    (A) receiving schedule guide information from the television signal source for input into a television guide;
    (B) receiving viewer selection of a particular show from the television guide;
    (C) identifying for the viewer other times when the particular show will be shown and other sources of the particular show;
    (D) displaying to the viewer the other times and the other sources of the particular show;
    (E) receiving viewer selection of a particular source from the display of the other times and the other sources of the particular show; and
    (F) displaying to the viewer information received from the selected source on the particular show.

4. The method of claim 1 wherein the television guide system receives the schedule guide information from at least two television signal sources.

5. The method of claim 4 further comprising the steps of:
    selecting a particular source from the display of the other times and the other sources of the particular show; and
    automatically switching an input of the television guide system to a television signal of the selected source, the television signal carrying the particular show selected from the television guide.

6. The method of claim 4 further comprising the steps of:
    mixing and sorting the schedule guide information in a desired order; and
    generating a display with the schedule guide information presented in the desired order in a television guide format.

7. The method of claim 2 wherein the television guide system receives the schedule guide information from at least two television signal sources.

8. The method of claim 7 wherein the other instances comprise information as to other times and other sources of the particular show, the method further comprising the steps of:
    selecting a particular source from the display of the other times and the other sources of the particular show; and
    automatically switching an input of the television guide system to a television signal of the selected source, the television signal carrying the particular show selected from the television guide.

9. The method of claim 7 further comprising the steps of:
    mixing and sorting the schedule guide information in a desired order; and
    generating a display with the schedule guide information presented in the desired order in a television guide format.

10. The method of claim 3 wherein the television guide system receives the schedule guide information from at least two television signal sources.

11. The method of claim 10 further comprising the step of automatically switching an input of the television guide system to a television signal of the selected source, the television signal carrying the particular show selected from the television guide.

12. The method of claim 10 further comprising the steps of:
   mixing and sorting the schedule guide information in a desired order; and
   generating a display with the schedule guide information presented in the desired order in a television guide format.

13. A television guide system for generating television guide information for a viewer, the system capable of receiving television signals from a plurality of sources, the system comprising:
   a receiver for receiving schedule guide data representing listings of television programs telecast from the plurality of sources and a source identifier for each listing;
   a memory, coupled to the receiver, for storing the schedule guide data;
   a display, coupled to the memory, for displaying some of the program listings in a guide format;
   a remote control for selecting one of the displayed program listings; and
   a microprocessor, coupled to said memory, for receiving an indicator signal associated with the selected program listing from the remote control, the microprocessor further searching the schedule guide data for all other times and all other sources of the television program represented by the program listing, the other times and the other sources for being displayed to the viewer on the display.

14. The system of claim 13, wherein the microprocessor mixes and sorts the schedule guide data in a desired order, and the display displays some of the program listings in the desired order in a television guide format.

15. The system of claim 13 further comprising:
   a controller, coupled to the memory, for receiving the indicator signal from the remote control, the indicator signal being associated with a source selected from the display of the other times and the other sources of the program;
   an emitter, coupled to the controller, for transmitting a control signal, the control signal automatically switching an input of the television guide system to a television signal of the selected source, the television signal carrying a show corresponding to the selected program listing.

* * * * *